(12) United States Patent
Lipniarski (10) Patent No.: US 8,202,018 B2
(45) Date of Patent: Jun. 19, 2012

(54) BLOW MOLDED PLASTIC INTERCONNECTION HAVING A RECEIVING SECTION AND A LOCKING SECTION

(75) Inventor: Daid J. Lipniarski, North Tonawanda, NY (US)

(73) Assignee: Confer Plastics, Inc., North Tonawanda, NY (US)

( * ) Notice: Subject to any disclaimer, the term of this patent is extended or adjusted under 35 U.S.C. 154(b) by 874 days.

(21) Appl. No.: 12/193,828

(22) Filed: Aug. 19, 2008

(65) Prior Publication Data

US 2010/0044152 A1 Feb. 25, 2010

(51) Int. Cl.
*F16G 11/10* (2006.01)
(52) U.S. Cl. ........................................ 403/353
(58) Field of Classification Search ............ 403/353
See application file for complete search history.

(56) References Cited

U.S. PATENT DOCUMENTS

| | | | | |
|---|---|---|---|---|
| 4,273,246 A * | 6/1981 | Thompson | | 215/398 |
| 5,453,055 A * | 9/1995 | van Huystee | | 472/116 |
| 5,736,170 A * | 4/1998 | Stoner | | 425/537 |
| 7,232,376 B2 * | 6/2007 | Droppleman | | 473/288 |
| 7,234,780 B2 * | 6/2007 | Lipniarski | | 297/461 |
| 7,275,289 B2 * | 10/2007 | Lipniarski | | 24/297 |
| 7,526,841 B2 * | 5/2009 | Lipniarski | | 24/297 |
| 7,832,584 B2 * | 11/2010 | Eggers et al. | | 220/7 |
| 2005/0079010 A1 * | 4/2005 | Droppleman | | 403/348 |

* cited by examiner

*Primary Examiner* — Victor MacArthur
(74) *Attorney, Agent, or Firm* — Roach Brown McCarthy & Gruber, P.C.; Kevin D. McCarthy (57) ABSTRACT

A blow-molded plastic female interconnection system has a receiving section and a locking section. The receiving section receives a male interconnect. The receiving section has a floor aperture shaped to allow the corresponding male interconnect be pushed into the locking section. The floor aperture can have various shapes depending on the shape of the male interconnect. Within the receiving section is a locking projection on the receiving section's back wall and the locking projection has a bottom section that defines a portion of the ceiling of the locking section which has no back wall. When the male interconnect is being pushed into the locking section, the locking projection deforms due to the locking sections no back wall. When the male interconnect is below the locking projection, the locking projection bottom section is positioned on the male interconnect to securely interconnect the male and female units.

1 Claim, 11 Drawing Sheets

BLOW MOLDED PLASTIC INTERCONNECTION HAVING A RECEIVING SECTION AND A LOCKING SECTION

FIELD OF THE INVENTION

A male and female blow-molded interconnection system is disclosed in this application.

BACKGROUND OF THE INVENTION

The present invention relates generally to molded articles which may be blow molded such as a blow-molded ladder or a blow-molded staircase for a swimming pool.

Swimming pool ladders or staircases and various other articles have been made from a plastic material by a process known as "blow-molding," as exemplified in commonly assigned U.S. Pat. No. 4,023,647 to Confer, commonly assigned U.S. Pat. No. 4,067,614 to Confer et al, and U.S. Pat. No. 4,166,833 to Schurman, all of which patents are hereby incorporated herein by reference. In the process of blow molding, a hollow thin-walled structure is formed having an exterior surface separated from an interior surface by the thin wall, and the hollow structure contains a fluid, in most cases air and/or water.

Pool Ladders with Vandal Guards

By way of background, swimming pool ladders of an A-frame type are positioned straddling a pool wall with the pool side having a ladder for entering and leaving the water (a.k.a., in-pool ladder) and an outside ladder for climbing over the outside of the pool wall (a.k.a., staircase ladder). In the past certain ladders of the foregoing type had relatively unwieldy structures for placing the outside ladder in an inaccessible position so as to prevent unauthorized entry into the pool. Also, insofar as known, ladders of the foregoing type, when disassembled, were not of a size which would fit into a box which was within the dimensions acceptable to commercial shippers. Other types of pool ladders were relatively complicated and difficult to assemble.

In U.S. Pat. No. 6,880,674; St-Hilaire wrote, "A door ladder assembly for use with the [sic] an above ground swimming pool, the assembly comprising a ladder having a plurality of steps, a door with a first side hingedly connected to one side of the ladder and arranged to hingedly move between open and closed positions, a handle being located at the top portion of the door, and a door lock to lock the door in a closed position, the door being provided with a lock operator to unlock the lock, the lock operator being located proximate the handle. The arrangement provides for easy access for an adult, while preventing a child from having access to the unlocking mechanism." A prior version of a door gate for a pool ladder was disclosed in U.S. Pat. No. 3,225,863 to Ludlow and U.S. Pat. No. 3,968,857 to Bryan. Each of these prior pool ladder barriers are doors that swing on a hinge and are positioned over the A-frame ladder's staircase ladder. These barriers are variations of conventional vandal guards used in other industries.

An alternative vandal guard is disclosed in U.S. Pat. No. 4,579,197 to Spurling. Spurling wrote, "A ladder shield for use in preventing toddlers and the like from climbing the steps of a ladder, such as an above-ground swimming pool ladder, when the ladder or the device to which the ladder is coupled is unattended is disclosed. The ladder shield comprises a rigid yet slightly flexible shell of plastic which is sized and shaped to fit around the front and sides of the ladder so as to block access to the steps on the ladder. The ladder shield is removably secured to the ladder by a removable locking bar which when inserted extends through a pair of holes in the side walls of the shield. The locking bar is secured in place by a lock. When not being used to prevent access to the steps of the ladder, the ladder shield may be used as a mini-foot wash."

Ladders with a Tambour

A tambour device is defined at www.dictionary.com as "a flexible shutter used . . . in place of a door, composed of a number of closely set wood strips attached to a piece of cloth, the whole sliding in grooves along the sides or at the top and bottom." Applicant conducted a search to determine if any ladder was associated with a tambour device. The closest reference, not a relevant reference, was U.S. Pat. No. 5,046,582 to Albrecht for a foldable ladder combination with truck cargo carrier. Albrecht wrote, "Commercial truckers frequently have situations arise where they require personal access to the elevated bed of the truck's cargo carrier. The cargo carrier may be mounted on the truck frame itself as in the case of a so-called bob-tail truck; or, the cargo carrier may be a trailer pulled by a truck tractor. In either case, the conventional truck cargo carrier includes an elongated approximately horizontal cargo bed elevated about four to five feet above ground level, and an elongated structural cargo enclosure extending upwardly from, and substantially covering the cargo bed. The cargo bed has a rear end from which cargo is loaded into and unloaded from the cargo carrier, and the structural cargo enclosure has at its rear end right and left side edges in the form of vertical posts extending upward from adjacent the rear end of the cargo bed, and typically has either a single "roll-up" tambour rear door which is engaged in slots disposed at the inboard lateral faces of the posts, or has a pair of swinging doors hinged to such vertical posts, for opening and closing the rear end of the structural cargo enclosure to provide loading and unloading rear access to the structural cargo enclosure and cargo bed."

Locking Mechanisms for Blow Molded Materials

Walter, in U.S. Pat. No. 1,911,539, Doernemann, in U.S. Pat. No. 5,536,111, Troester, in U.S. Pat. No. 5,013,508, and Tokunaga, in U.S. Pat. No. 3,759,043, all disclose a three-dimensional polymeric structure having a male and a female interlocking component. Not one of these disclosures has both interlocking components on a single side of the structure. Moreover, these references disclose both interlocking components contacting the edges of the sides, which allows easier forces to separate the components. As such, none of these references discloses an apparatus that forms at least a male and a female interlocking component on a single side, and preferably not contacting an edge of the side, of the structure.

In commonly assigned U.S. Pat. No. 7,234,780; Lipniarski wrote, "A device and method for forming an indented female connector where the dimension of the indented female connector provides for removing a male molding component without damaging a set of internal ribs formed inside the female connector. A structure comprising an indented female blow-molded connector having a first wall having a top surface and a thickness, with the first wall surrounding an opening. At least one inner wall extends substantially perpendicular to the first wall and borders the opening. At least one rib is formed in the inner wall. A bottom wall is joined to the inner wall and the distance from the rib to the top surface is greater than the thickness of the first wall. The structure further comprising a male connector having a contact edge that, when positioned inside the indented female blow-molded connector, engage the at least one rib, such that the male connector and indented female blow-molded connector are releaseably joinable with one another. Structures can be made that use the indented female blow molded connectors and male connectors including braced stools having three or four legs." This connection system requires the male component be inserted immediately into a female locking area (a.k.a., an immediate locking system), which is difficult for easy and secure assembly.

Since most blow molded polymeric materials have an immediate locking system, most blow molded polymeric materials having an immediate locking system also require additional interconnection devices be used to secure the assembly. Those additional interconnection devices include and are not limited to rods, screws and other conventional interconnection devices. See U.S. Pat. No. 6,769,513.

The present invention is directed to a blow molded plastic object having a female interconnection system comprising a receiving area and a locking area. We are aware of one patent that discloses a similar a female interconnection system. That patent is commonly assigned U.S. Pat. No. 6,190,600; which is hereby incorporated by reference. In that patent, Lipniarski wrote, "The present invention relates to an apparatus that forms a polymeric structure. The apparatus has a mold plate, a circular trench, a male and female interconnect, a vertical gap filler, and a cylinder. The mold plate has a predetermined geometric design. The circular trench is in the mold plate and the difference between the outer diameter and the inner diameter of the circular trench is a distance D. The male interconnect and the female interconnect are interspaced between each other. Each interconnect rotates within the circular trench and has a base and an interconnection portion. Each base has a width D and slidably mates to the mold plate. Each interconnect portion has a minimum width W which is less than D. The male interconnect portion protrudes downwards relatively from its base to a distance P, likewise the female interconnect portion protrudes upwards relatively from its base to a distance P. The vertical gap filler aligns with the circular trench and has a foundation and an extension. The extension has a width greater than W, a height greater than 2P, and protrudes upwards and downwards from its foundation. The cylinder rotates each interconnect to a predetermined position and raises the vertical gap filler so the foundation connects to the mold plate before any polymeric material is applied to the apparatus to form the polymeric structure. Once the polymeric structure is formed, the cylinder lowers the vertical gap filler until the extension is below the mold plate a distance greater than P and rotates each interconnect so the polymeric structure can be removed from the apparatus."

The claimed device in U.S. Pat. No. 6,190,600 is a mold for creating a first blow molded object that had a first male structure having a first extension and a first block and a first female structure having first receiving area and a first inhibiting area; and a second blow molded object that had a second male structure having a second extension and a second block and a second female structure having second receiving area and a second inhibiting area. Thereby the first blow molded object and the second blow molded object could have the first male structure inserted into the second receiving area and the second male structure inserted into the first receiving area. Rotating the first blow molded object in relation to the second blow molded object so the first male structure slides into the second inhibiting area and the second male structure slides into the first inhibiting area. The first and second inhibiting areas have no blow molded locking mechanism to secure the respective male structures in the inhibiting areas. Instead the inhibiting areas rely on the walls (which surround [that means a back wall] the male structure except where the male interconnect slides from the receiving area to the inhibiting area and the male extension that protrudes through an opening in the female inhibiting area) to provide a friction fit to inhibit the male structure from releasing itself from the female structure. The lack of a locking mechanism is acceptable for wave dispersion systems but not for ladders which require a more secure system. The present invention solves this problem for blow molded structures that require a secure locking mechanism.

SUMMARY OF THE INVENTION

A blow-molded plastic female interconnection system has a receiving section and a locking section. The receiving section receives a male interconnect. The receiving section has a floor aperture shaped to allow the corresponding male interconnect be pushed into the locking section. The floor aperture can have various shapes depending on the shape of the male interconnect. Within the receiving section is a locking projection on the receiving section's back wall and the locking projection has a bottom section that defines a portion of the ceiling of the locking section which has no back wall. When the male interconnect is being pushed into the locking section, the locking projection deforms due to the locking sections no back wall. When the male interconnect is below the locking projection, the locking projection bottom section is positioned on the male interconnect to securely interconnect the male and female units.

BRIEF DESCRIPTION OF THE FIGURES

The present invention will be described by reference to the following drawings, in which like numerals refer to like elements, and in which;

FIG. 9a illustrates a cross-section of FIG. 7b along the lines 9a-9a.

The present invention will be described in connection with a preferred embodiments, however, it will be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION OF THE INVENTION

Summarizing briefly in advance, the improved plastic pool ladder of the present invention comprises a plurality of molded plastic parts which are of a size so that they can be packaged conveniently for shipping within containers which are readily acceptable by the shippers and which can be assembled by interfitting connections and the use of a simple tool such as an assembler's weight, arms, foot, and possibly a hammer. Additionally, the A-frame of the ladder is assembled by the use of interfitting parts so that it is stable.

Figure 1:
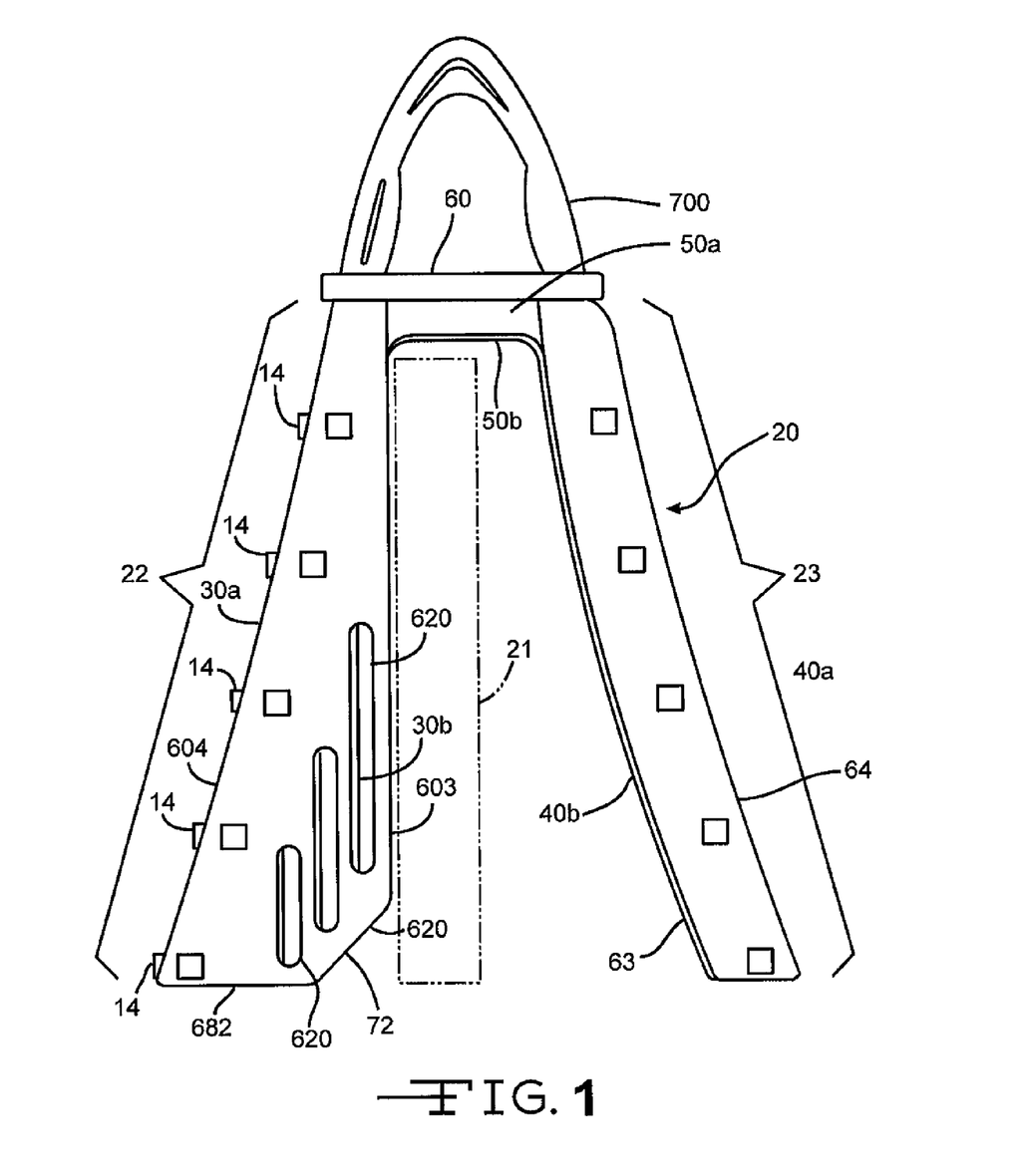
FIG. 1 illustrates a side view of the A-frame ladder positioned over a pool wall (dotted lines).

Referring now collectively to the various drawing figures and more particularly to FIG. 1 thereof, the present invention provides an improved freestanding reinforced A-frame plastic ladder structure, generally indicated at 20, which is particularly adapted to bridge an object 21, one example of which is shown as being the upstanding cylindrical side wall structure of an above-ground swimming pool, such side wall structure being depicted in phantom in FIG. 1. Of course, it will be readily appreciated that the inventive ladder structure herein illustrated and described is not limited to this particular end use, and possesses general utility in other applications apart from this specific swimming pool environment.

Figure 2:
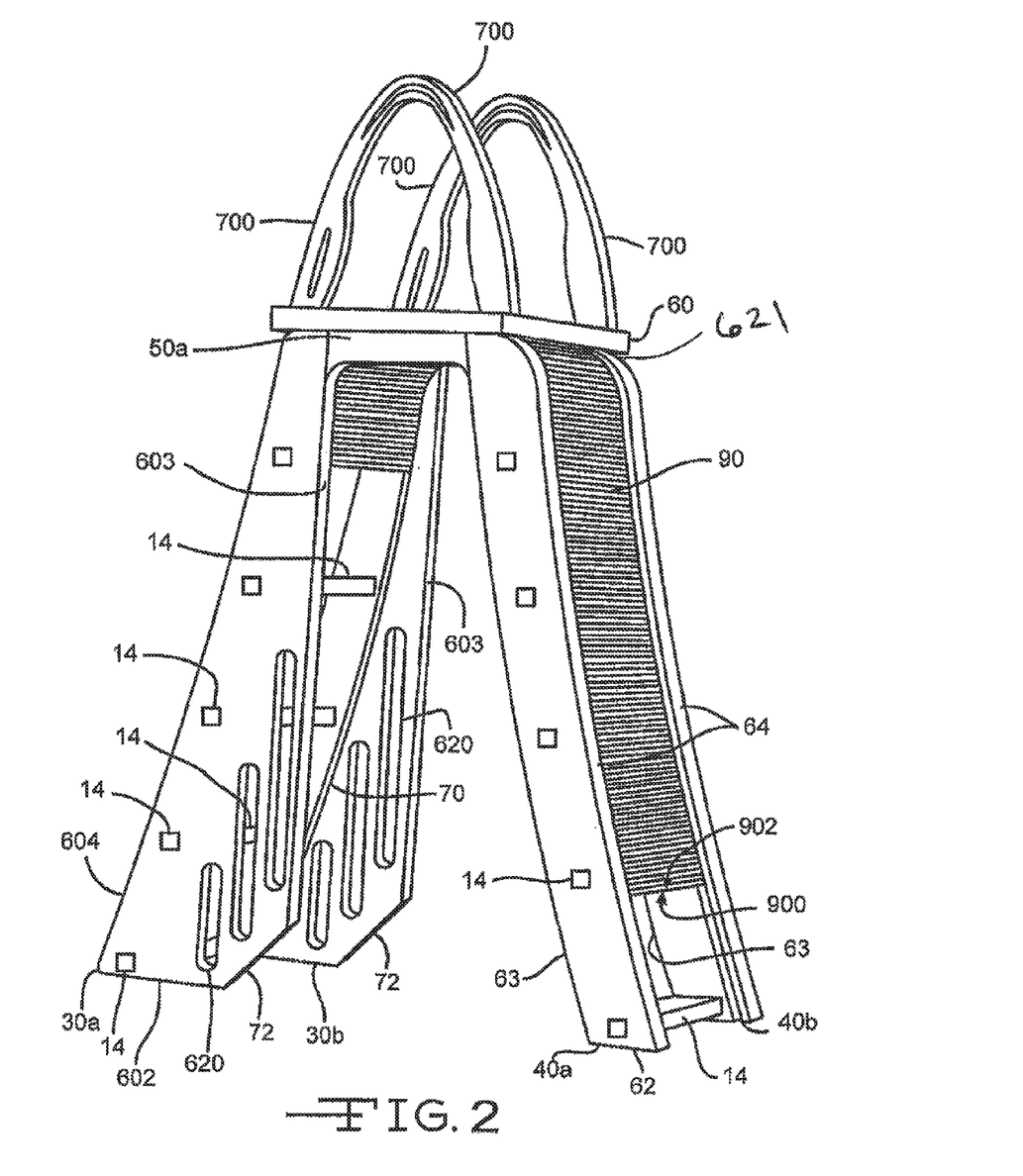
FIG. 2 illustrates an angled view of FIG. 1 that illustrates portions of both sets of rail structures for A-frame ladder.

The pool ladder 20 includes a plurality of molded plastic parts, certain of which are identical and assembled in mirror-image relationship to provide the completed pool ladder assembly 20 (FIGS. 1 and 2). At this point it will be noted that the mirror-image parts described hereafter are identical and will be designated by the same numbers even though they are assembled in mirror-image relationship, as will be apparent from the drawings. As noted above, all parts, including the tambour device, are fabricated of molded high density polyethylene, polypropylene and/or conventional polymers.

The improved pool ladder 20 includes an A-frame ladder formed of (a) an in-pool ladder 22 having opposed rail structures 30a, 30b (see FIG. 2) and steps 14; (b) a staircase ladder 23 having opposed rail structures 40a, 40b and steps 14 interconnecting the opposed rail structures; (c) opposing bridge structures 50a, 50b that interconnect (i) rail structures 30a and 40a together and (ii) rail structures 30b and 40b together; and (d) a platform 60 that secures opposing bridge structures, in-pool ladder and staircase ladder together. So there is no confusion, the platform 60, the in-pool ladder 22, the staircase ladder 23, tambour device 90, and opposing bridge structures 50a, 50b are blow-molded plastic materials, such as, for example, high density polyethylene or other suitable material to have a hollow interior.

Staircase Ladder

As previously stated, the staircase ladder's opposed rail structures 40a, 40b, and steps 14 are blow-molded of plastic, such as, for example, high density polyethylene, polypropylene and/or or other suitable material, to have a hollow interior. Each opposed rail structure 40a, 40b has a bottom edge 62, a proximal edge 63, and a distal edge 64 (proximal and distal edges for the staircase ladder are in relation to the in-pool ladder 22). The pair of identical generally planar parallel vertical opposed rail structures 40a/40b define the sides of the staircase ladder 23 and are interconnected by a series of alternating horizontal steps 14 preferably having suitable non-slip step surfaces. Vertical risers are optional for the staircase ladder except vertical risers cannot be located between the staircase ladder's top step and the platform 60 and/or where the staircase ladder's grooves (described later) extend toward the in-pool ladder. As seen in FIG. 2, the staircase ladder 23 has five steps 14 whereby the steps are spaced closer together than in typical four-step staircases to make it easier to enter and exit the pool.

In-Pool Ladder

The in-pool ladder's opposed rail structures 30a, 30b, and steps 14 are blow-molded of plastic, such as, for example, high density polyethylene, polypropylene and/or or other suitable material, to have a hollow interior. Each opposed rail structure 30a, 30b has a bottom edge 602, a proximal edge 603, and a distal edge 604 (proximal and distal edges for the in-pool ladder are in relation to the staircase ladder 23).

The bottom edge 602 slopes upwardly at or near the proximal edge 603 thereof, as illustrated at 72. Among the steps 14, the bottom edge 602 and the proximal edge 603, the opposed rail structures 30a, 30b can have a plurality of horizontally spaced generally rectangular elongate vertical cut-outs or openings 620. These ventilation openings 620 allow water to circulate through the in-pool ladder system to decrease algae growth.

The opposed rail structures 30a, 30b that extend from the steps 14 toward the pool wall 21 also inhibit individuals from swimming between the in-pool ladder system and pool wall 21. That safety feature was previously disclosed in commonly assigned U.S. Pat. No. 6,102,156 to Lipniarski, which is hereby incorporated by reference herein.

The pair of identical generally planar parallel vertical opposed rail structures 30a, 30b define the sides of the in-pool ladder 22 and are interconnected by a series of alternating horizontal steps 14 preferably having suitable non-slip step surfaces. Vertical risers are not required for the in-pool ladder for reasons disclosed later. As seen in FIG. 2, the staircase ladder has five steps 14 whereby the steps are spaced evenly as the typical four (4) step ladder (or staircase) and requires no height adjustment for various depth pools.

Steps, Rails and Interconnection System Thereof

The steps 14 are conventional polymeric steps as disclosed in commonly assigned U.S. Pat. No. 6,102,156 to Lipniarski except for the interconnection mechanism to the rail structures 30a, 40a, 30b, 40b. Each step 14 has a tread section 140 having a top surface 147, a front side 141, a back side 142, a bottom surface 146 (which can be identical or distinct (see FIG. 6) to the top surface 147) and two opposing joining ends 143. Each joining end 143 has an essentially planar section 144 designed to contact a portion of the respective rail structure 30a, 40a, 30b, 40b; and a plurality of transition sections 145a, 145b, 145c, and 145d that are more rounded in relation to the essentially planar section 144. The first transition section 145a is between the top surface 147 and the essentially planar section 144; the second transition section 145b is between the bottom surface 146 and the essentially planar section 144; the third transition section 145c is between the front side 141 and the essentially planar section 144; and the fourth transition section 145d is between the back side 142 and the essentially planar section 144. Each transition section 145a, 145b, 145c, and 145d may have a different configuration and/or contour due to the transition from the essentially planar section 144 to the respective surface which may have a different shape and/or contour to the other step surfaces.

Figure 3:
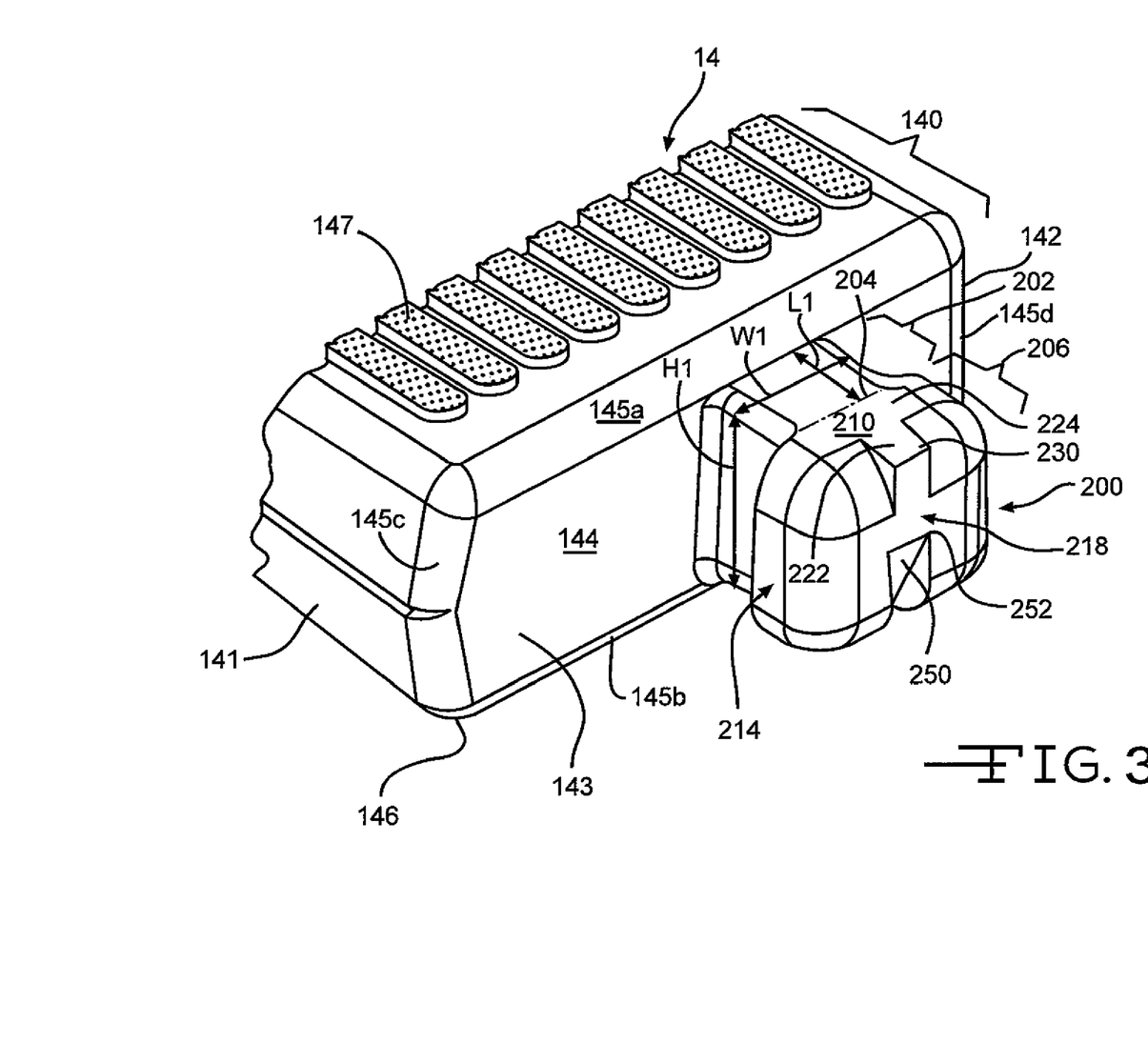
FIG. 3 is an exploded view of a step and its male interconnection.

Protruding from each joining end 143 is a male interconnection 200 (see FIG. 3). The male interconnection 200 can have numerous and various configurations. A fundamental feature of each male interconnection 200 is that it has an insertion section 202 and a locking section 206. Generically, the insertion section 202 is essentially perpendicular in relation to the joining end and the locking section 206 is angled, preferably perpendicular, to the insertion section 202. Exemplary configurations of the male interconnection 200 include and are not limited to the "T" shape, the "J" shape, a "L" shape, a serpentine shape, a zig-zag shape, and variations thereof.

For this application we will direct our attention to the "T" shape formation. The "T" shape male interconnection 200 has a length less than the width of the respective rail structure; a maximum height equal to, or slightly less than, the essentially planar section's 144 height; and various widths depending on the "T" shape formation's section. The insertion section protrudes from the joining end a distance greater than one/tenth and equal to or less than half the width of the rail structure.

Figure 7A:
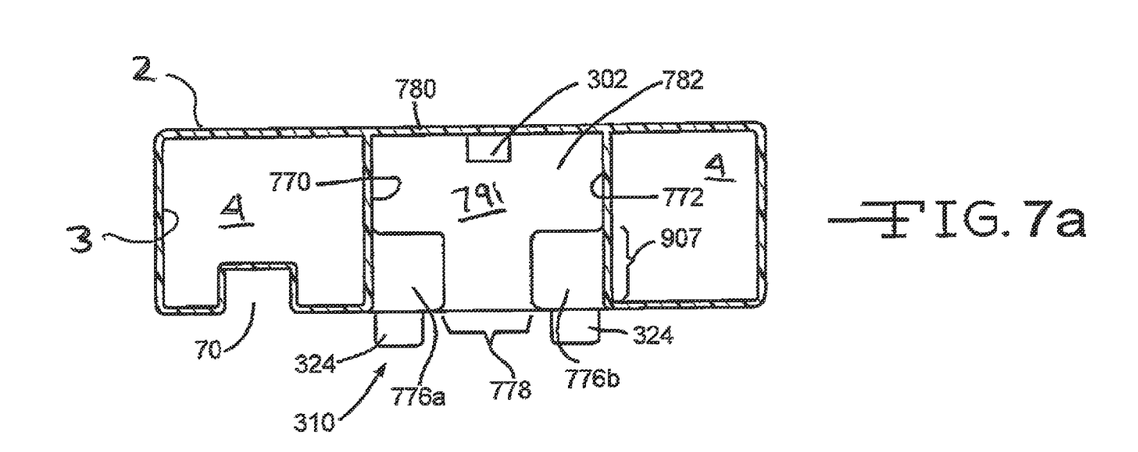
FIG. 7a illustrates the female opening of FIG. 6 taken along the lines 7-7.

The insertion section 202 is a narrow section with a predetermined height (H1), a predetermined width (W1), and a predetermined length (L1). The predetermined height, length and width correspond with the rail structure's locking area's first gap area 778 for width and length and walls 784, 786 for height and length, illustrated at FIG. 7a and described later. At the narrow section's distal end 204 (in relation to the joining end 143), is the locking section 206.

The locking section 206 (see FIG. 3) has a top surface 210, a bottom surface 212 (see FIG. 6), a front surface 214 (see FIG. 3), a back surface 216 (see FIG. 6), a pressure surface 218 (see FIG. 3); a slope section 250 (see FIG. 3), and respective rounded transition surfaces between (a) portions of the top surface 210 and portions of the pressure surface 218; (b) the top surface 210 and (i) the front surface 214 and (ii) the back surface 216; (c) the bottom surface 212 and (i) the front surface 214 and (ii) the back surface 216; (d) the narrow section 202 and (i) the front surface 214 and (ii) the back surface 216; (e) the pressure surface 218 and (i) the front surface 214 and (ii) the back surface 216; (f) portions of the bottom surface 212 and portions of the pressure surface 218. See FIGS. 3 and 6.

The bottom surface 212, the front surface 214, the back surface 216, the slope section 250, and the pressure surface 218 are essentially planar surfaces that contact a portion of the respective rail structure at one point when the step 14 is being inserted and/or secured into a rail structure's female opening 300.

The top surface 210 also has an essentially planar surface and it is shaped like the letter "T". The top of the "T" 222 extends from the narrow section's distal end 204; while the bottom of the "T" (a.k.a., locking ledge) 224 extends toward the broad section's distal end 230. The top of the "T" is 222 width is broader than the insertion section's 202 predetermined width (W1); while the locking ledge 224 is the same width as or wider than the rail structure's female opening's 300 protruding locking mechanism 302, which will be described in greater detail later in this specification.

The pressure surface 218 and the locking ledge 224 contact each other at an angle that will ensure the protruding locking mechanism positions itself over the locking ledge—is at or close (including rounded edges) to 90°. The remainder of the pressure surface 218 and the top of the "T" 222 are interconnected through the rounded transition surfaces. The rounded transition surface and the locking ledge 224 are connected by planar walls (essentially vertical).

Figure 6:
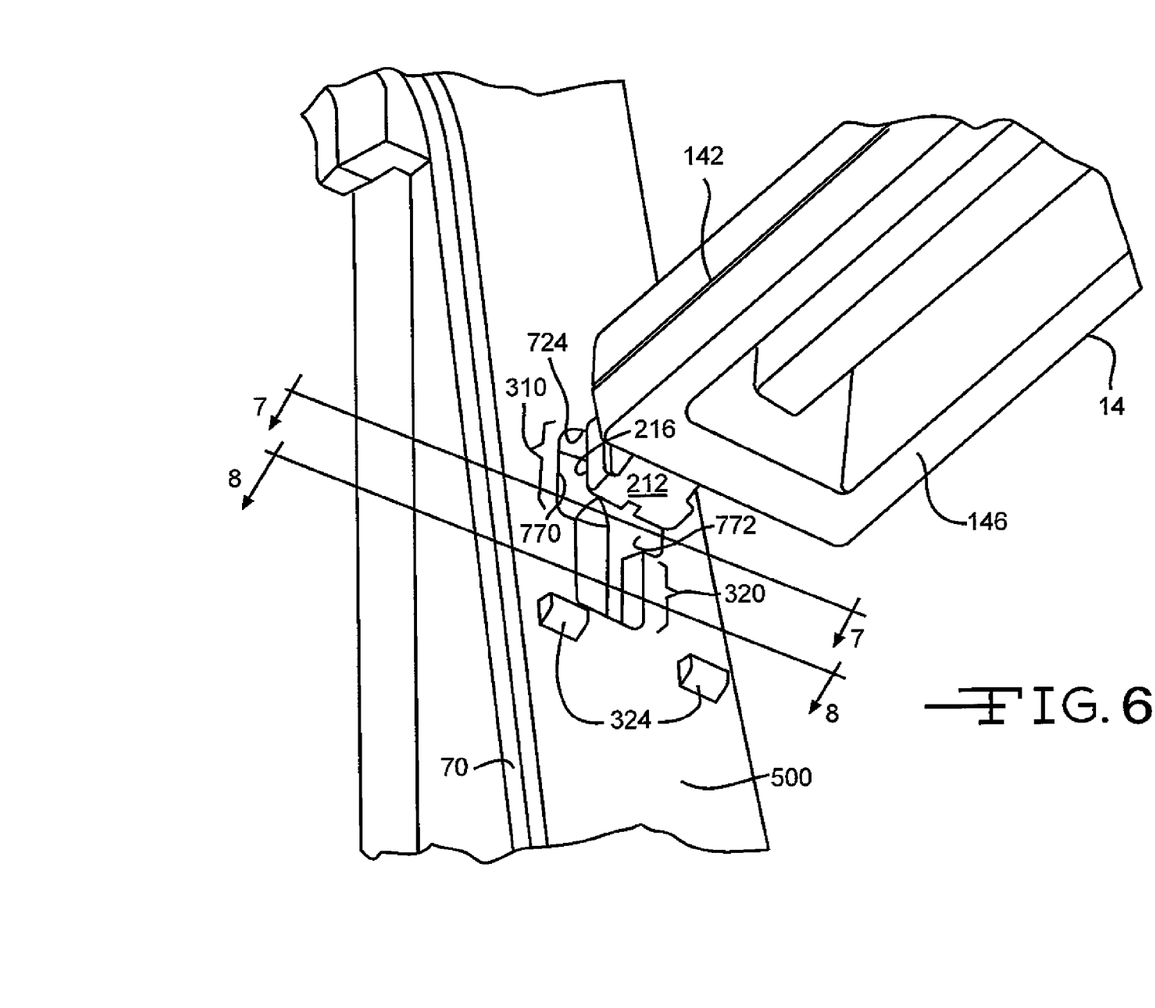
FIG. 6 illustrates a step just prior to entering a rail structure's female opening.

As illustrated in FIG. 6, the bottom surface 212 has an essentially planar surface and a portion thereof that terminates at the inclined surface 250. The inclined surface's distal end 252 (in relation to the step 14) is at the pressure surface 218 as illustrated in FIG. 3. The inclined surface 250, portion of the pressure surface 218, and the locking ledge 224 have the same width and are aligned with each other.

Figure 4:
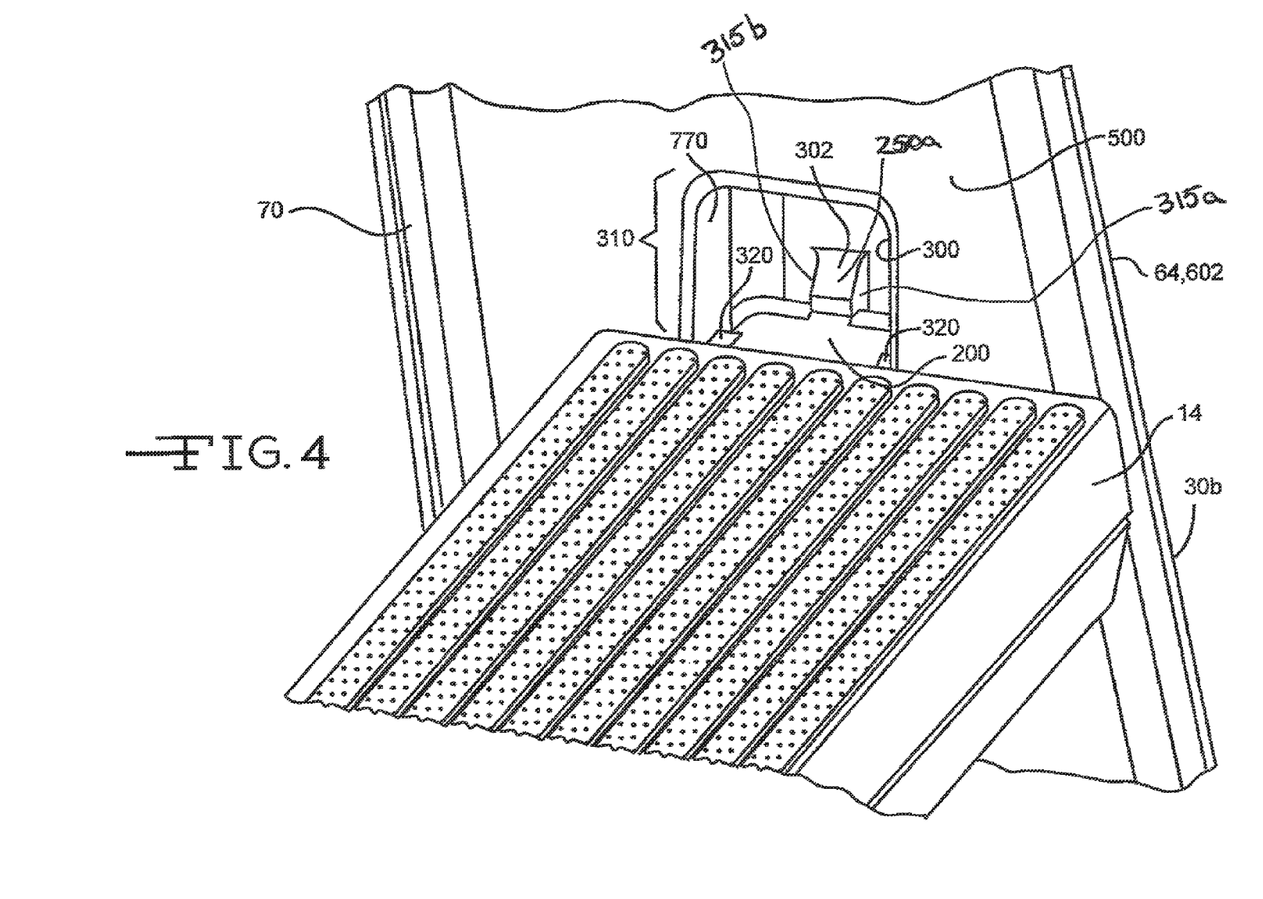
FIG. 4 is a view of a step securely positioned in a rail structure looking at the interior side of the rail structure.
Figure 5:
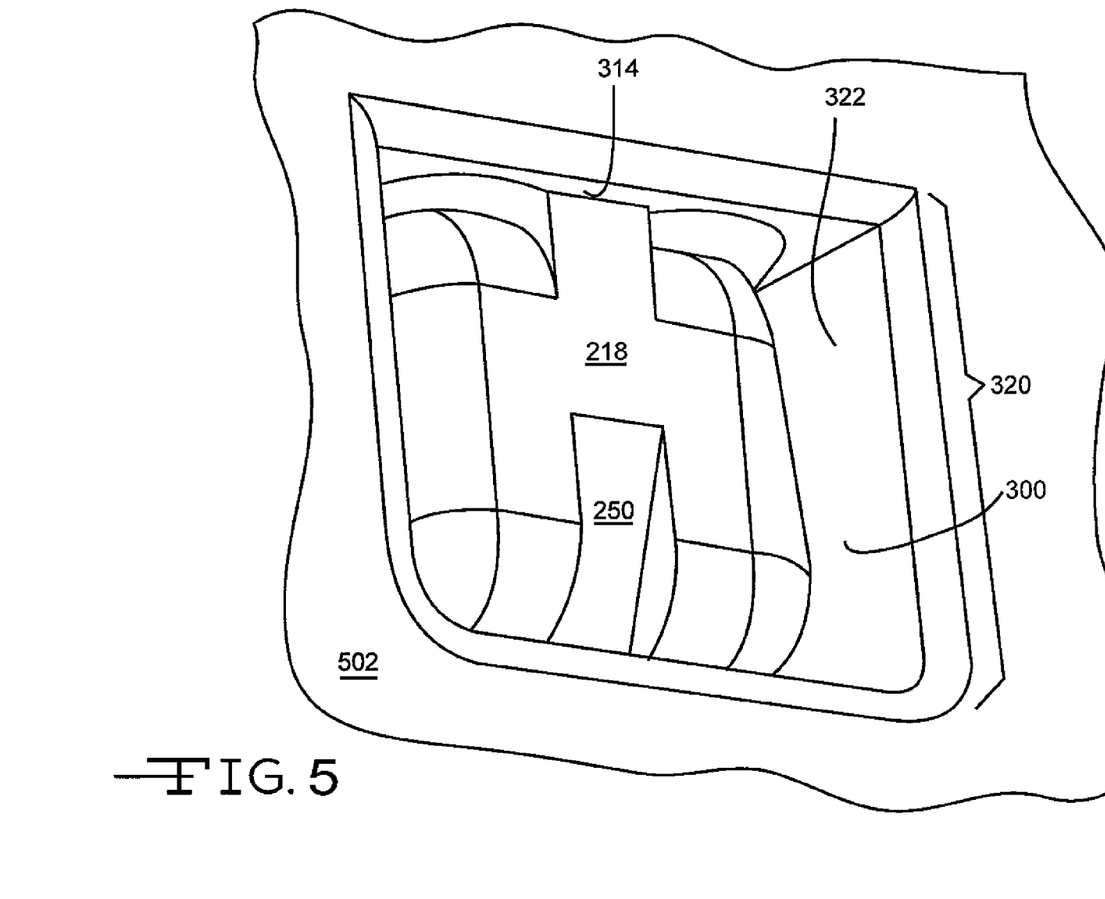
FIG. 5 a view of a step securely positioned in a rail structure looking at the exterior side of the rail structure.
Figure 7B:
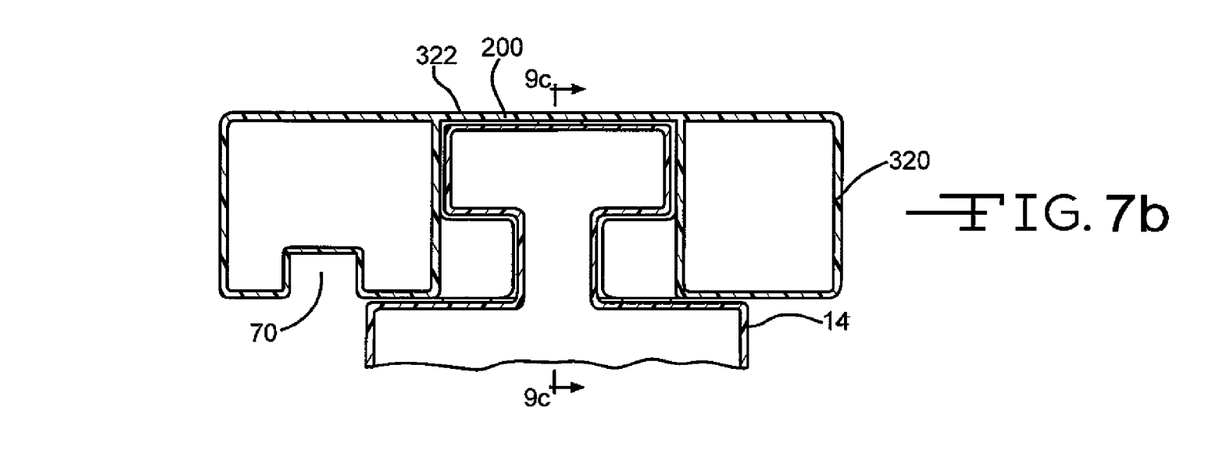
FIG. 7b illustrates FIG. 7a with the step positioned in the female opening's receiving section.
Figure 9A:
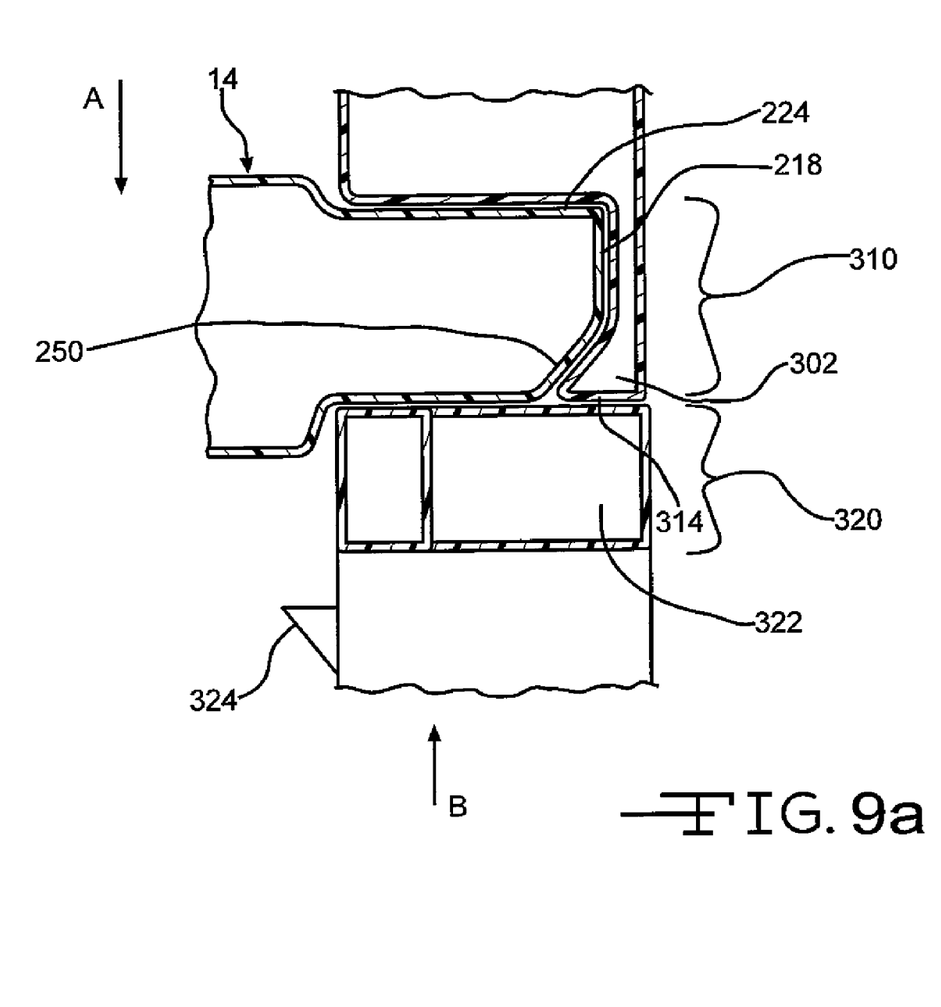
Figure 9B:
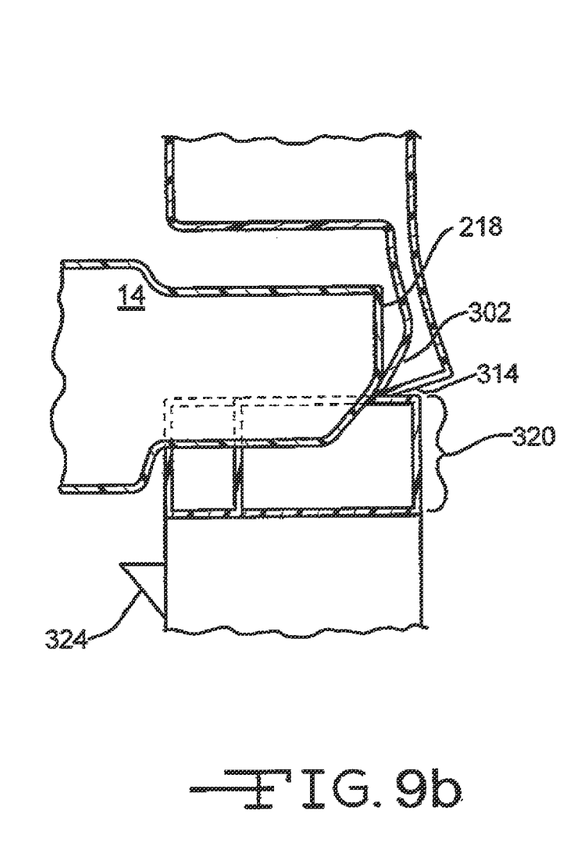
FIG. 9b illustrates a transition between FIGS. 9a and 9c.
Figure 9C:
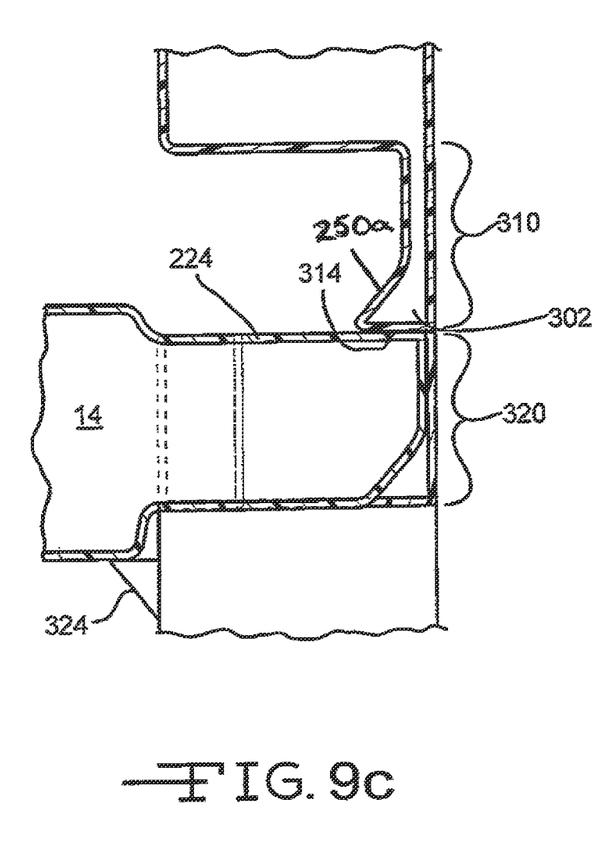
FIG. 9c illustrates a cross-section of FIG. 8b along the lines 9c-9c.

This alignment of the inclined surface 250, portion of the pressure surface 218, and the locking ledge 224 is desired so that when the inclined surface 250 is positioned over the protruding locking mechanism 302 (see FIGS. 7b and 9a) and an appropriate force is applied upon (a) the step 14 (arrow A) and/or (b) the rail structure (arrow B), the inclined surface 250 forces the protruding locking mechanism 302 (and possibly the rail structure (in particular a back wall 780 described later) and/or the male interconnection 200) to gradually deform (see FIG. 9b) so the protruding locking mechanism 302 is eventually positioned against the pressure surface 218 until the pressure surface 218 is positioned below the protruding locking mechanism 302 as illustrated in FIGS. 4 and 9c. At which time, the protruding locking mechanism 302 reverts to its original shape and/or position and is positioned over at least a portion of the locking ledge 224. The step 14 is then securely positioned in the rail structure.

Obviously the female opening 300 (positioned on the rail structure's interior surface 500—not the interior wall that defines the cavity of the hollow structure, but the interior surface of the rail structure that contacts the step's joining end) is designed to securely receive the male interconnection 200 to the rail structure. Each female opening 300 has two sections. The first section is a receiving section 310 (see FIGS. 4, 6 and 7a—looking down into the opening). The receiving section 310 is an open cavity (see FIG. 7a [no male interconnect therein—the dash-dot lines indicate the rail material that defines the bottom surface of the locking area 320 and diagonal lines indicate the locking area's narrow section 907 and bottom surface 776a,b] of the receiving section 310, and 7b—a male interconnect therein) that receives the male interconnection 200 with the protruding locking mechanism 302 therein. The receiving section receives the entire male interconnection 200 (see FIGS. 7b and 9a). The protruding locking mechanism has a bottom 314 (see FIGS. 5, 9a-c). The bottom 314 along with wall 776a,b differentiates the receiving section from a locking area.

Figure 8A:
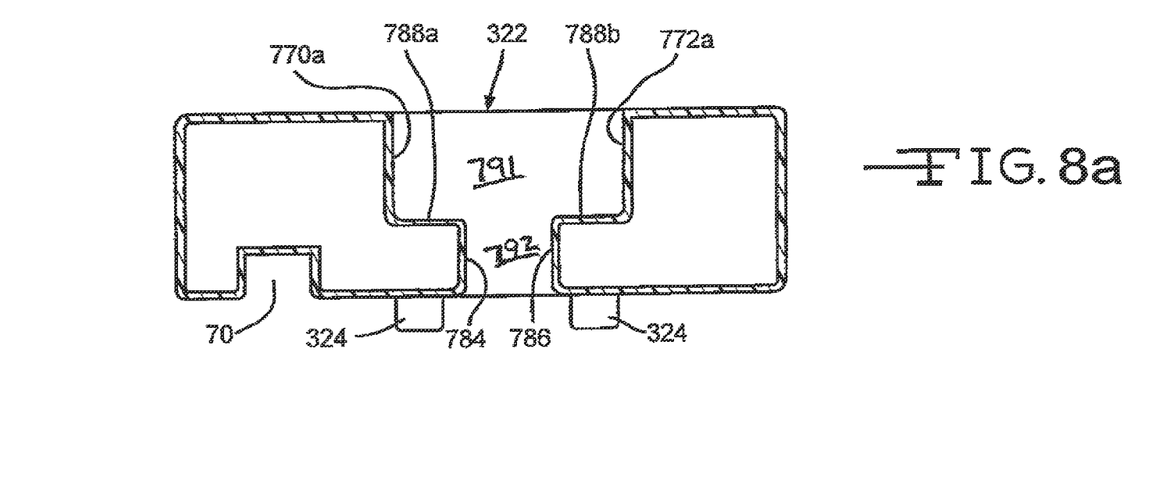
FIG. 8a illustrates the female opening of FIG. 6 taken along the lines 8-8.
Figure 8B:
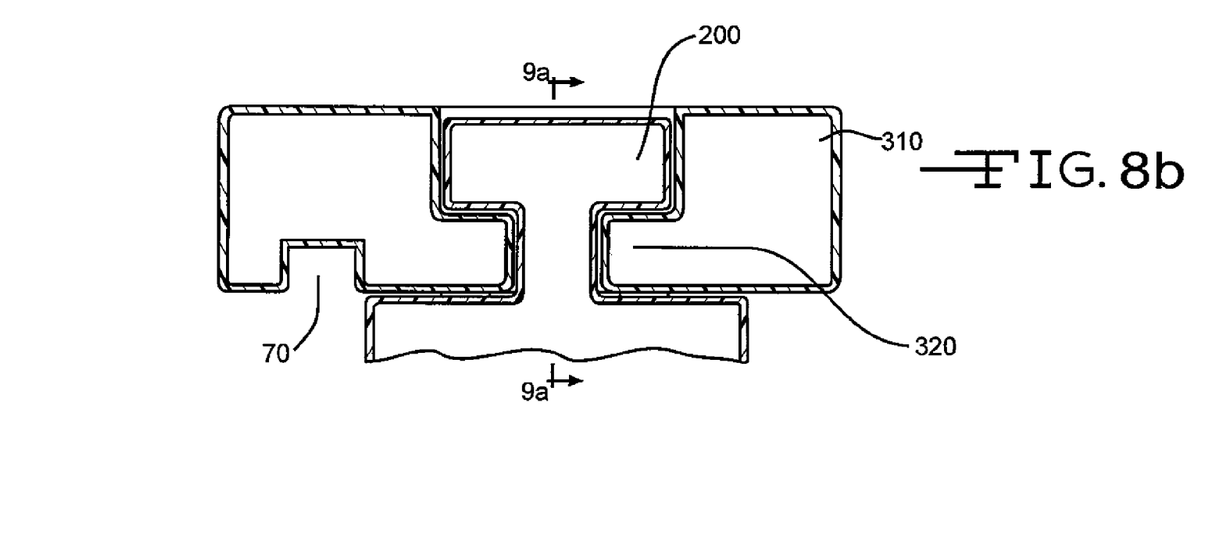
FIG. 8b illustrates FIG. 7a with the step positioned in the female opening's locking area.

The second section is a locking area 320. The locking area 320 is shaped as the mold for the male interconnection 200 (see FIGS. 8a (no male interconnect therein and the dash-dot lines indicate the rail material that defines the bottom surface of the locking area 320) and 8b), and may be just slightly larger as in many male/female interconnections. On the interior surface 500 of the rail structure and positioned below the locking area 320 are support projections 324 that contact the step's bottom surface 146 when the step is securely positioned in the locking area 320.

To promote fluid circulation which decreases the growth of undesirable particulates (for example and not limited to bacteria, and mold) and to provide sufficient expansion area not to damage the rail structure and the step 14 when the step is being inserted into the rail structure, the locking area 320 has an aperture 322 (a.k.a., no back wall) on the exterior surface 502 (opposite side of where the step's male interconnection enters the female opening) of the rail structure (see FIGS. 5, 7a, 7b, 9a-c).

The protruding locking mechanism 302 can be triangular as illustrated, squared, rectangular, polygoned or a half a ball shape. The only requirements are that the bottom 314 of the protruding locking mechanism 302 be sufficiently protruding to securely lock (contact) the step 14 into the rail structure and able to deform the back wall 780 when the male interconnect 200 is being positioned into the locking area 320. Obviously the step 14 can be removed from the rail structure by excessive forces, such as sledge hammer. In view of the obvious, step 14 is designed not be removed from the rail structures through conventional forces.

In generic terms, the female opening for the T-shaped male connector is a hollow molded object having a first wall having an exterior surface and an interior surface. The interior surface is separated from the exterior surface by a thickness of the first wall. The interior surface defines a cavity to contain a fluid and a portion of the exterior surface surrounds an opening. The opening has the receiving section 310 and the locking section 320.

As illustrated, the receiving section has (A) a first inside wall 770 (see FIGS. 4, 6, 7a), (B) a second inside wall 772, (C) a third inside wall 774 (see FIG. 6), (D) a first part of a fourth inside wall 776a, (E) a second part of a fourth inside wall 776b, (F) a first gap area 778 between the first part and the second part of the fourth inside wall, (G) a back wall 780, and (H) a second gap area 782 (i) having a width equal to the combined widths of the first gap area, the first part of the fourth inside wall and the second part of the fourth inside wall, and (ii) is between (a) the first part of the fourth inside wall, the second part of the fourth inside wall and the first gap area, and (b) the back wall.

The first inside wall, the second inside wall, the third inside wall, the first part and the second part of the fourth inside wall, extend substantially perpendicular to the portion of the exterior surface wherein (a) the first inside wall and the second inside wall are opposite each other and (b) (i) the third inside wall and (ii) the first part and the second part of the fourth inside walls are opposite each other.

The back wall 780 has the locking projection 302 that projects toward the opening and has the bottom layer 314 that is the same plane as the first part and the second part of the fourth wall.

The locking section 320 has no back wall (a.k.a., aperture 322—see FIG. 5), a second part of the first inside wall 770a, a second part of the second inside wall 772a, a fifth inside wall 784, a sixth inside wall 786, a first part of a seventh inside wall 788a, a second part of the seventh inside wall 788b, and an eighth inside wall 790.

The fifth inside wall extends substantially perpendicular to the portion of the exterior surface and the first part of the fourth inside wall. The sixth inside wall extends substantially perpendicular to the portion of the exterior surface and the second part of the fourth inside wall. The first gap area is also between the fifth inside wall and the sixth inside wall. A portion of the eighth inside wall extends substantially perpendicular to the portion of the exterior surface, the fifth inside wall and the sixth inside wall. The first part of the seventh inside wall extends substantially perpendicular to the first part of the fourth inside wall and the fifth inside wall. The second part of the seventh inside wall extends substantially perpendicular to the second part of the fourth inside wall and the sixth inside wall. The remaining portion of the eighth wall defines a base wall of the second gap area and covers the area of the missing back wall. The second part of the first inside wall defines a first side wall of the second gap area and covers the area of the missing back wall; while the second part of the second inside wall defines a second side wall of the second gap area and covers the area of the missing back wall. The second part of the first inside wall, the second part of the second inside wall, the fifth inside wall, the sixth inside wall, the first and second parts of the seventh inside walls have a predetermined height that corresponds to the height of the corresponding male interconnect.

What is unique about this interconnection system is that the entire interconnection is a polymeric material and it does not use any screws, nails, or equivalent structures. Moreover, the male interconnection 200 securely fits within the female opening 300 without damaging the step 14 and/or rail apparatus. This polymeric interconnection of the male interconnection 200 within the female opening 300 is so secure that the connection will not be dislodged under conventional forces being applied to the step 14 and/or rail apparatus.

In other words, the present invention is directed to an indented female blow-molded connector formed in a hollow molded object as described above and illustrated in the instant figures. The hollow molded object has (A) a principal proximal surface 500,
(B) a principal distal surface 708,
(C) a principal right side surface 64,
(D) a principal left side surface 63,
(E) a principal top side surface 621, and
(F) a principal bottom side surface 62.

All of the above-identified surfaces and following surfaces are formed from a single continuous wall. The single continuous wall has (A) an exterior surface 2,
(B) a thickness that separates an interior surface 3 from the exterior surface 2; and
(C) a cavity 4 that contains a liquid and borders portions of the interior surface.

From that understanding, the hollow molded object has a first opening 300, a second opening 322 and a third opening 782. The first opening 300 is positioned on the principal proximal surface and, shaped like the letter "T" wherein the first opening's lower section 320 is (i) shaped to securely receive a portion of a male interconnecting object 200 having a section with a height H1, a width W1 and length L1 wherein the first opening's lower section's length extends from the first opening's 300 upper section's 320 bottom side toward the principal bottom side surface 62 and the first opening's lower section has rounded bottom edges and (ii) a part of a locking section.

Similarly, the first opening's upper section 310 is (i) shaped with a height at least equal to the first opening lower section's height H1, a width greater than the first opening lower section's width W1, preferably, the first opening's width extends an equivalent distance toward the principal right side surface 64 and the principal left side surface 63 on both sides in order to securely lock the male interconnecting object 200 in the locking section; and (ii) a part of a receiving section. In other words, the first opening's width is equal to (a) the left horizontal bottom surface's 776a width, (b) the right horizontal bottom surface's 776b width, and (c) the width w1, which is also the width of the first opening's bottom surface 792.

The second opening 322 is (A) shaped like the first opening's upper section 310, (B) on the principal distal surface 708, and (C) a part of the locking section.

The receiving section, as previously stated formed from the single continuous wall, is defined by a top inside horizontal surface 724, a first vertical right inside side surface's 772, a first vertical left inside side surface's 770, the left horizontal bottom surface 776a, the right horizontal bottom surface 776b, the width of the first opening's bottom surface 792, and the principal distal surface's moveable, locking distal inside vertical surface 708.

The top inside horizontal surface 724, that is perpendicular in relation to the principal proximal surface 500, and (i) extends from the first opening upper section's 320 top side to the principal distal surface's 708 interior surface, and (ii) borders (a) the principal distal surface's 708 moveable, locking distal section's 780 upper edge; (b) the first vertical left inside side surface's 770 top edge that is perpendicular in relation to the principal proximal surface 500; and (c) the first vertical right inside side surface's 772 top edge that is perpendicular in relation to the principal proximal surface 500.

The first vertical right inside side surface's 772 (i) proximal edge is the first opening upper section's 310 right edge, (ii) distal edge contacts the principal distal surface moveable, locking distal section's 780 right edge, and (iii) extends from the top inside horizontal surface's 724 right side edge to
- (a) a right horizontal bottom surface 776b; and
- (b) the locking section's third opening bottom surface's 791 right edge, and while in the locking section, the first vertical right inside side surface's 772 (i) distal edge is the second opening's 322 right edge in relation to the principal proximal surface 500 and (ii) proximal edge contacts a right locking vertical surface's 788b right edge.

The first vertical left inside side surface's 770 (i) proximal edge is the first opening upper section's 310 left edge, (ii) distal edge contacts the principal distal surface moveable, locking distal section's 780 left edge, and (iii) extends from the top inside horizontal surface's 724 left side edge to
- (a) a left horizontal bottom surface 776a; and
- (b) The locking section's third opening bottom surface's 791 left edge, and while in the locking section, the first vertical left inside side surface's 770 (i) distal edge is the second opening's left edge in relation to the principal proximal surface and (ii) proximal edge contacts a left locking vertical surface's 788a left edge.

The first opening's lower section separates (i) the left horizontal bottom surface 776a from the right horizontal bottom surface 776b and (ii) the second vertical left inside surface 784 from the second vertical right inside surface 786, and has the first opening's bottom surface 792 that (i) extends from the principal proximal surface 500 to the third opening bottom surface's 791 distal middle edge and borders the second vertical left inside surface's 784 bottom edge and the second vertical right inside surface's 786 bottom edge.

The principal distal surface's moveable, locking distal inside vertical surface 708 (i) is bordered by (a) the first vertical left inside side surface's distal edge in the receiving section; and (b) the first vertical right inside side surface's distal upper edge in the receiving section; (ii) is the second opening's top side, and (iii) has a protruding locking extension.

The right horizontal bottom surface's 776b proximal edge is the first opening upper section's 310 bottom right side edge, and the right horizontal bottom surface 776b extends from the first opening upper section's 310 bottom right side edge to the third opening 782.

The left horizontal bottom surface's 776a proximal edge is the first opening upper section's 310 bottom left side edge, and the left horizontal bottom surface extends from the first opening upper section's bottom left side edge to the third opening 782.

The third opening 782, for the above paragraphs, is positioned between the principal distal surface's moveable, locking distal section's 780 bottom edge and (i) the right horizontal bottom surface's 776b distal edge in the receiving section; (ii) the left horizontal bottom surface's distal edge 776a in the receiving section and (iii) an imaginary line extending from the right horizontal bottom surface's 776b distal edge and the left horizontal bottom surface's distal edge 776a. The third opening is further defined by the area referred to as the third opening bottom surface 791.

The right locking vertical surface 788b extends from (i) the right horizontal bottom surface's 776b distal end to the third opening's bottom surface 791 right proximal side in relation to the principal proximal surface 500 and (ii) the first vertical right inside surface's 772 proximal end in the locking section to a second vertical right inside surface's 786 distal edge.

The left locking vertical surface 788a extends from (i) the left horizontal bottom surface's 776a distal end to the third opening's bottom surface 791 left proximal side in relation to the principal proximal surface and (ii) the first vertical left inside surface's 770 proximal end in the locking section to a second vertical left inside surface's 784 distal edge.

The protruding locking extension 302 has a planar horizontal bottom section 314, an inclined section 250a, a right inclined section 315a and a left inclined section 315b. The protruding locking extension 302 has a width less than the first opening's lower section's (otherwise area 792 width, and a length that allows the moveable, locking distal inside vertical surface 780 to (i) move distally when a male interconnect object 200, having a narrow section and a broad section, wherein the broad section has an area slightly less than the third opening 782, applies a downward force to the protruding locking extension 302, and (ii) revert to its original position when no downward force is applied to the protruding locking extension to inhibit the male interconnect object 200 from being removed from the locking section.

The locking section is formed from the single continuous wall, and is formed from the left locking vertical surface 788a, the right locking vertical surface 788b, the second vertical right inside surface 786, the second vertical left inside surface 784, the third opening's bottom surface 791, the first opening's bottom surface 792, and the second opening 322.

Tambour Embodiment

Vertical risers were required in the prior art for the in-pool ladder to inhibit individuals from swimming between the steps. Without those vertical risers, there is an increased potential the individual can position themselves by swimming and/or sliding between the steps. That action allows the individual an opportunity to be stuck between the steps and/or trapped between the in-pool ladder system and pool wall 21. Neither opportunity is desired; and the present invention solves that problem and the pool ladder barrier problem by a different means.

Figure 10:
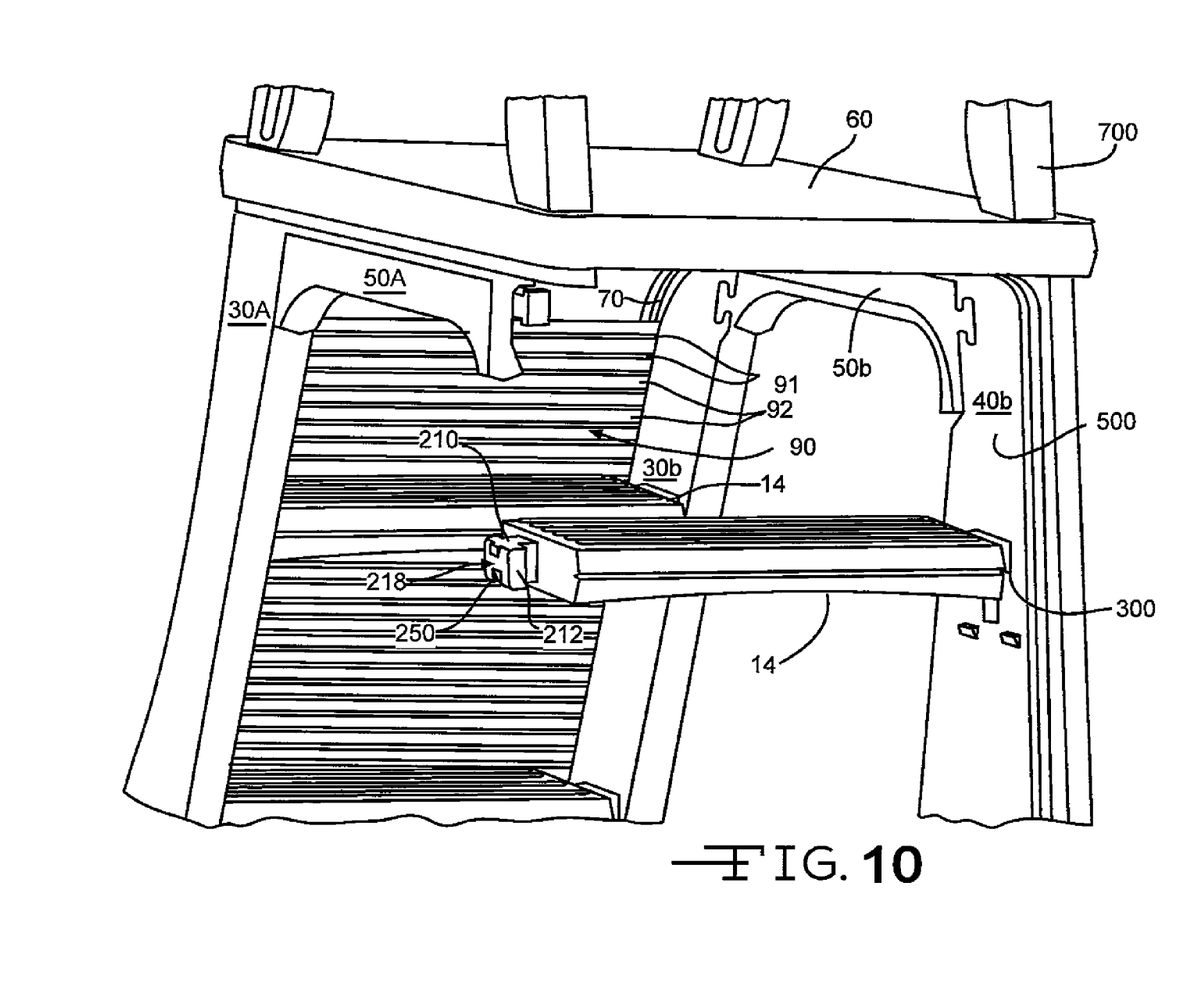
FIG. 10 illustrates an enlarged view of FIG. 1 looking at an angle toward rail structure 30b—which is missing to illustrate the grooves and the interconnection of the bridge structures to the rail structures.

That different means is a tambour gate/barrier device 90. The tambour gate/barrier device 90 is preferably a plurality of polymer hollow tubing 91 interconnected to each other through a thin, flexible polymeric plate 92 (see FIG. 10) to form a flexible and durable tambour gate/barrier device that is blow-molded. In a preferred embodiment the polymeric hollow tubing has a diameter ranging from 1/16 inch to 1 inch and a wall thickness ranging from 0.01 to 0.90 inches. Preferably the thin polymeric plate ranges from 0.01 to 0.08 inches thick. Thereby the tambour gate/barrier device 90 provides the desired strength and flexibility to perform as a tambour device to inhibit an individual from getting caught between the steps and/or between the in-pool ladder system and pool wall 21 when the staircase ladder is suppose to be opened; and creating a barrier for individuals from climbing the staircase ladder when the pool should not be used.

The tambour gate/barrier device 90 is positioned within a groove 70 (see FIGS. 2, 4, 6, 7a-b, 8a-b, 10). The groove 70 has a width and depth that allows the tambour gate/barrier device 90 to move freely up and down. On the staircase ladder, the bridge and the in-pool ladder, the groove 90 is positioned on the interior surface 500. On the staircase ladder, the grooves are positioned between the steps 14 and the rail structure's distal edge 600 (furthest edge from the pool wall 21) (see FIGS. 2 and 10). In this position, the tambour gate/barrier device 90 inhibits individuals from climbing the steps 14. In many embodiments, the grooves do not extend to the bottom step. Instead, the grooves extend to the second last step to allow an individual to easily lock/unlock the tambour gate/barrier device 90 to the second last step.

The tambour gate/barrier device 90 has a handle area 900 (see FIG. 2). The handle area 900 has a pulling/pushing mechanism 902 and an aperture 904. When the tambour gate/ barrier device 90 is positioned in front of the steps 14 of the staircase ladder, the aperture 904 is positioned above the second last step when the bottom step contacts the ground or is close to the ground. Thereby a conventional locking system, for example an oval-shaped locking system, a lock and cable system or equivalents thereof can be inserted into the aperture and around the second last step to securely lock the tambour gate/barrier device 90 over the staircase ladder's steps. The cable should have a length that does not allow the tambour gate/barrier device 90 to expose the second last step without removing the locking system.

Obviously if the bottom step is above the ground and a conventional locking system can easily be used, the tambour gate/barrier device 90 can extend to the bottom step and have the aperture positioned above the bottom step to allow the conventional locking system to be used.

When the tambour gate/barrier device 90 is unlocked from the staircase ladder, a person lifts and/or pushes the tambour gate/barrier device 90 to the in-pool ladder in order to expose the staircase ladder's steps. The tambour gate/barrier device 90 remains in the grooves and the grooves for the in-pool ladder are positioned between the steps 14 and the rail structure's proximal edge 602 (closest edge to the pool wall 21) (see FIGS. 2, 4, 6, and 10). In the in-pool ladder, the grooves extend to the ladder bottom 602 so the tambour gate/barrier device can be inserted into the ladder system. When operating, the groove extends to the bottom step, which is positioned on the pool floor and the tambour gate/barrier device 90 should contact the bottom step when the tambour gate/barrier device 90 is positioned on the in-pool ladder. That way the tambour gate/barrier device 90 inhibits individuals from getting stuck or caught between the stairs and/or between the in-pool ladder and the pool wall 21.

After the swimmers have left the pool, the user pulls and/or pushes the tambour gate/barrier device 90 over the staircase ladder. Thereby the staircase ladder is blocked and the water in the pool can circulates more freely within the ladder area, which decreases the chance of stagnant water and adverse results therefrom.

Interconnecting Platform, Bridge and Ladders

The bridge structure 50a interconnects rail structures 30a and 40a together and the bridge structure 50a interconnects rail structures 30b and 40b together. The interconnection is performed by a conventional tongue and groove system between the bridge structures and the respective rail structures. To ensure the bridge structures 50a,b do not move, platform 60 interconnects to the bridge structures 50a,b through a tongue and groove system. In the latter embodiment, each bridge structure has a tongue that extends into a corresponding groove in the platform 60; or vice versa. Thereby the platform secures the bridge structures 50a, 50b and the rail structures 30a, 30b, 40a, and 40b together.

Alternatively, each rail structures 30a, 30b, 40a, and 40b can have a handle 700 section that extends through a respective aperture 62a, 62b, 62c, and 62d. Each handle section interconnects to a corresponding handle section—for example handles of rail structures 30a and 40a interconnect together and handles of rail structures 30b and 40b interconnect together to form a respective upside-down "U" figure on and over the platform 60—for safety reasons.

While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. An indented female blow-molded connector formed in a hollow molded object, the hollow molded object has
    (A) a principal proximal surface,
    (B) a principal distal surface,
    (C) a principal right side surface,
    (D) a principal left side surface,
    (E) a principal top side surface, and
    (F) a principal bottom side surface;
all formed from a single continuous wall, the single continuous wall has
    (A) an exterior surface,
    (B) a thickness that separates an interior surface from the exterior surface; and
    (C) a cavity that contains a liquid and borders portions of the interior surface;
comprising:
    a first opening positioned on the principal proximal surface and, shaped like the letter "T" wherein
    (A) the first opening's lower section is
        (i) shaped to securely receive a portion of a male interconnecting object having a section with a height H1, a width W1 and length L1 wherein the first opening's lower section's length extends from the first opening's upper section's bottom side toward the principal bottom side surface and the first opening's lower section has rounded bottom edges and
        (ii) a part of a locking section; and
    (B) the first opening's upper section is
        (i) shaped with a height at least equal to the first opening lower section's height H1, a width greater than the first opening lower section's width W1 by equivalent distances on both sides in order to securely lock the interconnecting object in the locking section; and
        (ii) a part of a receiving section,
    a second opening is (A) shaped like the first opening's upper section, (B) on the principal distal surface, and (C) a part of the locking section;
    the receiving section is formed from the single continuous wall, and defined by
    (A) a top inside horizontal surface, that is perpendicular in relation to the principal proximal surface, and
        (i) extends from the first opening upper section's top side to the principal distal surface's interior surface, and
        (ii) borders
            the principal distal surface's moveable, locking distal section's upper edge;
            a first vertical left inside side surface's top edge that is perpendicular in relation to the principal proximal surface; and
            a first vertical right inside side surface's top edge that is perpendicular in relation to the principal proximal surface;
    (B) the first vertical right inside side surface's (i) proximal edge is the first opening upper section's right edge, (ii) distal edge contacts the principal distal surface's moveable, locking distal section's right edge, and (iii) extends from the top inside horizontal surface's right side edge to
        (a) a right horizontal bottom surface, the right horizontal bottom surface's proximal edge is the first opening upper section's bottom right side edge, and the right horizontal bottom surface extends from the first opening upper section's bottom right side edge to a third opening, the third opening is positioned between the principal distal surface's moveable, locking distal section's bottom edge and the right horizontal bottom surface's distal edge in the receiving section; and (b) the locking section's third opening bottom surface's right edge, and while in the locking section, the first vertical right inside side surface's (i) distal edge is the second opening's right edge in relation to the principal proximal surface and (ii) proximal edge contacts a right locking vertical surface's right edge, and the right locking vertical surface extends from (i) the right horizontal bottom surface's distal end to the third opening's bottom surface right proximal side in relation to the principal proximal surface and (ii) the first vertical right inside surface's proximal end in the locking section to a second vertical right inside surface's distal edge;

(C) the first vertical left inside side surface's (i) proximal edge is the first opening upper section's left edge, (ii) distal edge contacts the principal distal surface's moveable, locking distal section's left edge, and (iii) extends from the top inside horizontal surface's left side edge to (a) a left horizontal bottom surface, the left horizontal bottom surface's proximal edge is the first opening upper section's bottom left side edge, and the left horizontal bottom surface extends from the first opening upper section's bottom left side edge to the third opening, the third opening is also positioned between the principal distal surface's moveable, locking distal section's bottom edge and the left horizontal bottom surface's distal edge in the receiving section; and (b) the locking section's third opening bottom surface's left edge, and while in the locking section, the first vertical left inside side surface's (i) distal edge is the second opening's left edge in relation to the principal proximal surface and (ii) proximal edge contacts a left locking vertical surface's left edge, and the left locking vertical surface extends from (i) the left horizontal bottom surface's distal end to the third opening's bottom surface left proximal side in relation to the principal proximal surface and (ii) the first vertical left inside surface's proximal end in the locking section to a second vertical left inside surface's distal edge;

(D) the first opening's lower section separates (i) the left horizontal bottom surface from the right horizontal bottom surface and (ii) the second vertical left inside surface from the second vertical right inside surface, and has the first opening's bottom surface that (i) extends from the principal proximal surface to the third opening bottom surface's distal middle edge and borders the second vertical left inside surface's bottom edge and the second vertical right inside surface's bottom edge;

(E) the principal distal surface's moveable, locking distal inside vertical surface (i) is bordered by (a) the first vertical left inside side surface's distal edge in the receiving section; and (b) the first vertical right inside side surface's distal upper edge in the receiving section; (ii) is the second opening's top side, and (iii) has a protruding locking extension;

the protruding locking extension has a planar horizontal bottom section, an inclined section, a right inclined section and a left inclined section;

the protruding locking extension has a width less than the first opening's lower section's width, and a length that allows the moveable, locking distal inside vertical surface to (i) move distally when a male interconnect object, having a narrow section and a broad section, wherein the broad section has an area slightly less than the third opening, applies a downward force to the protruding locking extension, and (ii) revert to its original position when no downward force is applied to the protruding locking extension to inhibit the male interconnect object from being removed from the locking section;

the locking section is formed from the single continuous wall, and is formed from the left locking vertical surface, the right locking vertical surface, the second vertical right inside surface, the second vertical left inside surface, the third opening's bottom surface, the first opening's bottom surface, and the second opening.

* * * * *